June 17, 1930  E. J. WITCHGER  1,763,941
MICROMETER CALIPER
Filed March 9, 1928
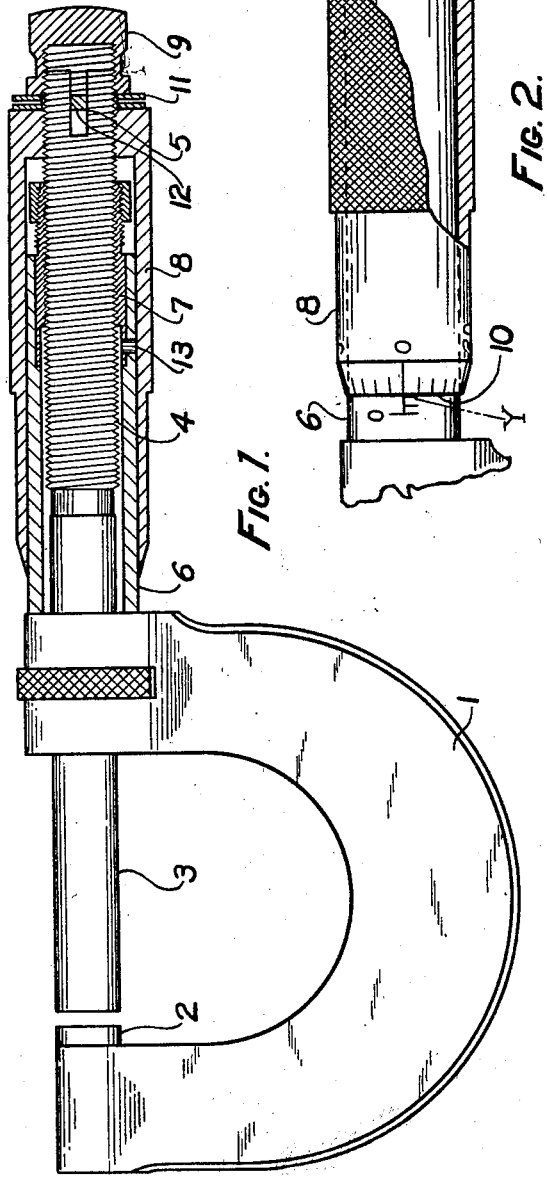
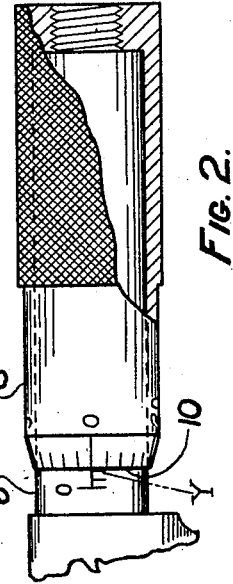
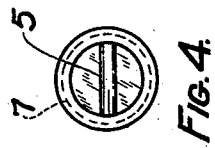
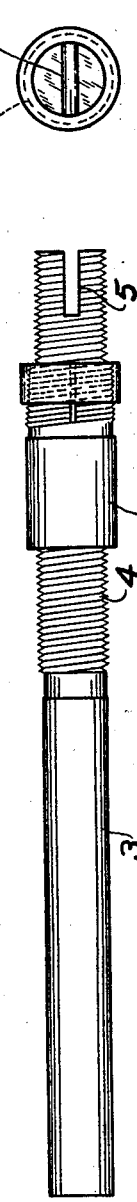
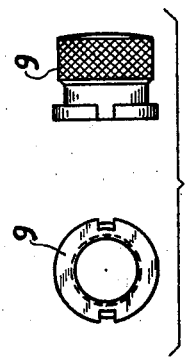
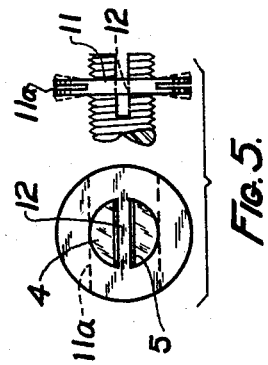
INVENTOR
EUGENE J. WITCHGER
BY George B Willcox
ATTORNEY Patented June 17, 1930

1,763,941

UNITED STATES PATENT OFFICE

EUGENE J. WITCHGER, OF SAGINAW, MICHIGAN, ASSIGNOR TO LUFKIN RULE CO., OF SAGINAW, MICHIGAN, A CORPORATION OF MICHIGAN

MICROMETER CALIPER

Application filed March 9, 1928. Serial No. 260,266.

This invention relates to micrometer gauges and has for its primary object to provide a means for rotating the adjustable rotatable graduated sleeve so as to bring the zero mark back into correct position after its adjustment has been disturbed by wear upon the end of the spindle or anvil, or because of any other derangement of the sleeve adjustment.

A further object is to provide simple means, easily manipulated, for releasably locking the graduated sleeve and the spindle together without disturbing the above mentioned adjustments when made.

Another object is to make the threaded spindle-frictioning nut in the barrel easily accessible to facilitate adjusting the force of its frictional engagement with the threads of the spindle.

In the drawings Fig. 1 is a part sectional side view of a micrometer gauge embodying my invention.

Fig. 2 is a sectional side view of the rotatable sleeve.

Fig. 3 is a side view of the spindle and the frictioning nut.

Fig. 4 is an end view of the parts shown in Fig. 3.

Fig. 5 is a detail of the washer on the end of the screw.

Fig. 6 is a detail of the end locking nut.

A micrometer caliper is the form of micrometer gauge selected for purposes of the present description, although it is evident that other forms of instruments embodying my invention may be used.

The frame 1 of the caliper is provided with anvil 2, spindle 3 and measuring screw 4, which latter is formed with a slot 5 in its end. The spindle 3 and slotted screw 4 are preferably in one piece.

Barrel 6 which encloses screw 4 is secured to frame 1, and within the bore of the barrel is fitted a frictioning nut 7, through which the spindle is threaded. The end of the spindle is movable toward and away from the anvil by rotating the spindle in nut 7. The usual rotatable graduated sleeve 8 encloses barrel 6 and the end of the sleeve is bored and threaded to screw onto the end of measuring screw 4.

For reading the distance between the anvil and the spindle the barrel 6 is provided with a longitudinally disposed scale Y, and there is the sleeve 8 provided with the peripheral scale 10 upon its beveled edge for co-operating with the longitudinal scale Y, each of these scales having a zero mark.

To correct for wear on the end of the spindle, or for any other reason, to bring the peripheral graduation 10 back to its proper zero position without adjusting the anvil, spindle 3 is first properly seated on the anvil 2 and then the sleeve 8, (having been released from its locked engagement with the spindle by a device which will presently be described), is rotated to zero. Since the thread in the end of graduated sleeve 8 is the same pitch as the thread in the frictioning nut 7, the rotation of sleeve 8 that brings the longitudinal zero lines of the barrel and sleeve into register also brings the beveled edge of the graduated sleeve into register with one of the transverse lines of the scale on the barrel.

The correct relationship between the anvil and the spindle and the zero reading of the scale on the sleeve is thereby restored.

Locking the rotatable sleeve 8 to screw 4 of the spindle, without any likelihood of disturbing their zero relationship after being positioned as above described, is preferably accomplished by the fastening devices shown in Figs. 1, 5 and 6, where 9 is a knurled lock nut and 11 is a bar washer which is interposed between the base of the nut and the end face of sleeve 8, its cross bar 12 received in the slotted end 5 of screw 4.

The lock nut 9 serves to secure screw 4 and sleeve 8 together in locked relationship so powerfully that no soldering, heretofore commonly used for that purpose, is required. While lock nut 9 is being screwed down tight upon washer 11 the latter, itself incapable of turning, can not turn or likewise disturb the accurate zero positioning of sleeve 8. To best accomplish this result I preferably use a washer of special construction.

In Fig. 5 the washer 11 is shown with opposed kerfs 11ª cut into its edges, the lips of the kerfed edges slightly spread apart as indicated by the dotted lines. These spread lips give a cushioning quality to the washer when it is first squeezed by the lock nut 9, the purpose being to cause the washer to rotate very slightly at the first contact with lock nut 9, so that the bar 12 of the washer will come into contact with the walls of slot 5 in screw 4, taking up all back lash at that point when the first engagement of lock nut 9 with washer 11 occurs. With back lash so eliminated, washer 11 can not turn further, no matter how tightly lock nut 9 is screwed down, and consequently the washer can not produce even the slightest tendency to rotate sleeve 8 or screw 4 away from its adjusted zero position while the locking nut 9 is being set down tight.

Frictioning nut 7 is pinned at 13 to the inside of barrel 6.

The spindle thread 4 is easily accessible for adjustment or cleaning because of the convenient arrangement and removability of the locking device above described. After removing the lock nut 9 and washer 11 the sleeve 8 is unscrewed from screw 4 and is removed, leaving the screw 4 exposed and accessible for inspection, cleaning or repair.

It is now evident that by threading the spindle through the non-rotatable frictioning nut 7, threading the graduated sleeve on the spindle, and releasably locking the spindle and sleeve together by a suitable locking device, the several objects of the invention as previously set forth are attained.

Having thus described my invention, what I claim and desire to secure by Letters Patent is:

A micrometer gauge including a threaded spindle having a slotted end and a sleeve with graduations thereon, wherein the graduated sleeve has an end bored and threaded upon the spindle for endwise and rotary adjustment in relation thereto to facilitate correctional zero setting of said sleeve, and means securing the sleeve and spindle together, said means comprising an internally threaded cap received on the threaded end of the spindle and a bar washer engaging the slotted end of the spindle and received between the end of the sleeve and the base of said cap, for the purposes set forth.

In testimony whereof, I affix my signature.

EUGENE J. WITCHGER.